United States Patent [19]

Lambert

[11] 4,279,291

[45] Jul. 21, 1981

[54] SUBTERRANEAN HEATING AND COOLING SYSTEM

[75] Inventor: Roland Lambert, Jackson, Miss.

[73] Assignee: Ladek Corporation, Ridgecrest, La.

[21] Appl. No.: 51,405

[22] Filed: Jun. 25, 1979

[51] Int. Cl.³ .............................................. F24J 3/02
[52] U.S. Cl. ......................................... 165/1; 62/260; 126/400; 165/45; 165/108
[58] Field of Search ................. 165/45, 1, DIG. 4, 18, 165/108; 62/260; 126/400

[56] References Cited

U.S. PATENT DOCUMENTS

| | | | |
|---|---|---|---|
| 2,677,243 | 5/1954 | Telkes | 165/18 |
| 2,917,240 | 12/1959 | Schwarzmayr | 126/400 |
| 3,937,973 | 2/1976 | Weber et al. | 165/45 |
| 4,024,910 | 5/1977 | Werner | 165/45 |
| 4,139,056 | 2/1979 | Schöll | 165/45 |

FOREIGN PATENT DOCUMENTS 1089865  3/1955  France ........................ 165/45

Primary Examiner—Sheldon J. Richter
Attorney, Agent, or Firm—Lowe, Kokjer, Kircher Wharton & Bowman

[57] ABSTRACT

An underground conduit extends through the soil in two parallel stretches and connects at one end with a return duct and at the opposite end to the air intake of a heating and cooling unit. The return air duct may be closed off by a damper so that the return air is diverted through the underground conduit. The underground conduit may also be coupled with a forced air unit which is independent of any heating and cooling system. An air diverter in one stretch of the conduit recycles air through the conduit while a portion of the air is utilized. The constant temperature of the subterranean region results in the circulating air in the underground conduit being heated in winter and cooled in summer. To increase the air turbulence and the effectiveness of the heat transfer, the conduit may be corrugated. Sand may be packed around the conduit to retain moisture for more effective cooling.

5 Claims, 3 Drawing Figures

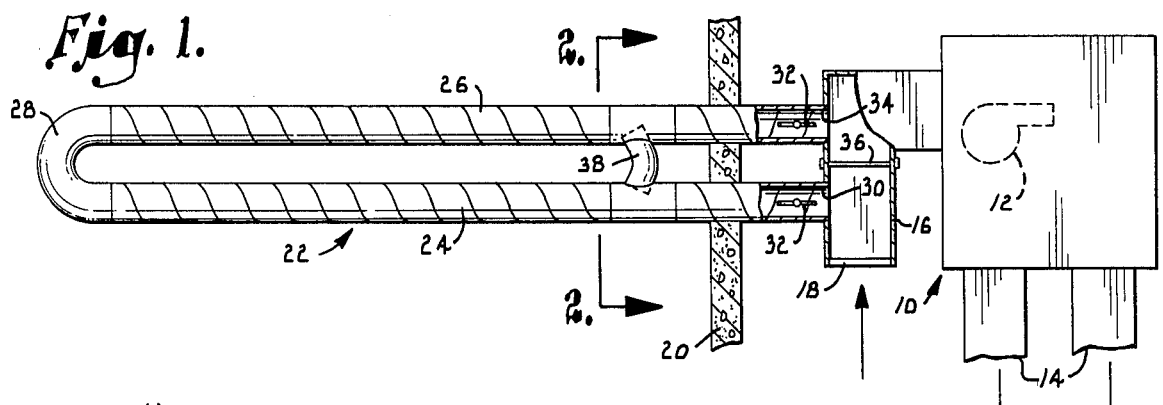
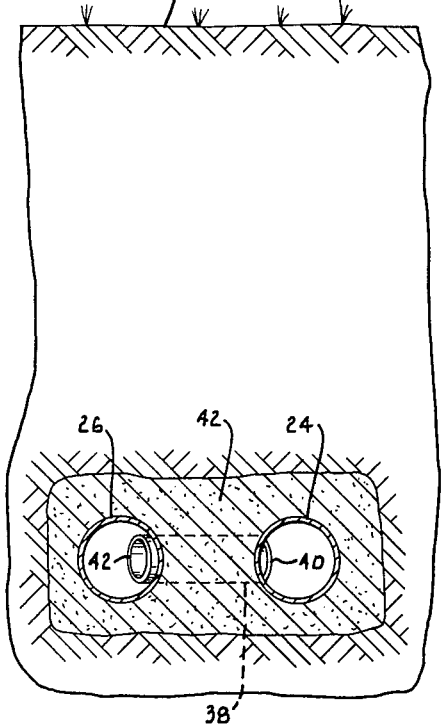
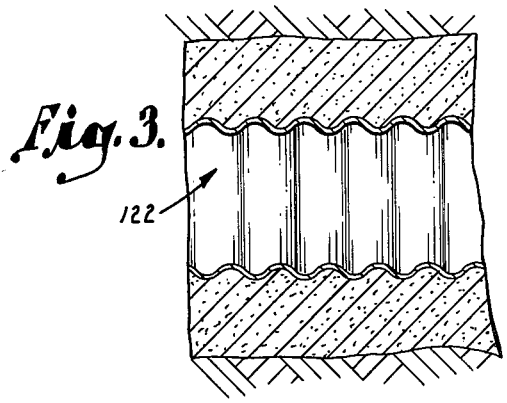

SUBTERRANEAN HEATING AND COOLING SYSTEM

This invention relates in general to the thermal treatment of air and deals more particularly with an improved subterranean heating and cooling system.

With recent increases in fuel costs and the emphasis on energy conservation, it has become increasingly important to efficiently heat and cool buildings. Although it has long been recognized that the ground is cooler in the summer and warmer in the winter than the ambient air, this fact has not been used to advantage in the development of heating and cooling systems. Attempts to utilize the subterranean area as a medium to provide a heating or cooling effect have been unsuccessful, primarily because of the expense involved.

The various systems which have heretofore been used for subterranean heating and cooling have involved considerable expense in excavating and installing. One of the major problems which has been encountered is that the length of underground tubing required to obtain adequate heat exchange with the ground is considerable.

The present invention eliminates many of the problems heretofore associated with subterranean heating and cooling by providing for a novel manner of recycling air passing through the underground conduit. This allows for the length of the conduit to be substantially shortened while increasing the effective length of the path traveled by the air which is in heat exchange relationship with the ground.

It is therefore a primary object of the present invention to provide an improved underground heating and cooling system method which makes effective use of subterranean temperature conditions in order to heat and cool buildings.

Another object of the invention is to provide an underground heating and cooling system which may be installed as an original part of the heating and cooling plant for a building or easily added to various types of existing plants. It is significant in this respect that little or not structural modification of the building is necessary in order to install the underground conduit, either originally or as an addition to an existing air conditioning plant.

An important one of the aims of my invention is to provide an improved underground heating and cooling system which makes effective use of subterranean temperature conditions and may be installed as the sole source of heating and cooling in some buildings, thereby eliminating the need to rely on outside energy sources.

As a corollary to the above object, a principal aim of the invention is to provide an improved subterranean heating and cooling system which uses a shorter length of underground conduit thereby reducing the cost of installation but increases the effective length of the conduit by providing for the recycling of air under the ground.

Still another object of the invention is to provide an underground heating and cooling system which may be coupled with an existing air conditioning plant so as to provide a closed path from the return air duct of the existing plant to direct the return air through the underground pipe before it reaches the primary heating and cooling unit.

A further objective of the invention is to provide an underground heating and cooling system as described which includes means for controlling the airflow through the underground pipe and the return air duct in accordance with the heating or cooling requirements of the building.

Yet another object of the invention is to provide an underground heating and cooling system as described which is constructed simply and economically and which significantly reduces the energy required to control building temperature.

Other and further objects of the invention will be apparent from the following description and claims when read in light of the accompanying drawings.

In the drawings, which form a part of the specification and are to be read in conjunction therewith, and in which like reference numerals are employed to indicate like parts in the various views:

FIG. 1 is a top plan view of a subterranean heating and cooling system constructed according to the present invention, with portions broken away for purposes of illustration;

FIG. 2 is a vertical cross-sectional view taken along line 2—2 of FIG. 1 in the direction of the arrows; and FIG. 3 is a fragmentary vertical cross-sectional view of an alternate form of conduit which may be used in the present invention.

Referring now to the drawing in detail and initially to FIG. 1, reference numeral 10 generally designates a conventional heating and cooling unit which acts to condition air that is to be distributed within a building. The unit 10 typically includes a furnace for heating air in the winter and a cooler for cooling air in the summer, along with a humidifier or dehumidifier. A conventional fan 12 is employed to circulate the conditioned air through distribution ducts 14 which extend from the unit to the rooms of the building which are to be heated or cooled.

A return air duct 16 delivers air to the heating and cooling unit 10. Normally the return duct 16 receives a mixture of air consisting of fresh outside air and air from within the rooms of the building, although it may receive only air from within the building. In either case, the fan 12 normally draws the air through duct 16 and into the air conditioning unit 10, where it is heated or cooled and distributed through ducts 14. Duct 16 has an air filter 18 which serves to remove dirt and other impurities from the incoming air stream. A cement wall is designated by the numeral 20 and represents the basement or foundation wall of the building to be heated or cooled.

In accordance with the present invention, a conduit 22 is disposed underground and passes through concrete wall 20. Conduit 22 comprises first and second parallel stretches 24 and 26 which are coupled together at one end by an elbow 28. One end of conduit stretch 24 presents an inlet 30 which is coupled with return air duct 16. A damper 32 disposed adjacent inlet opening 30 controls air flow into conduit stretch 24.

One end of second conduit stretch 26 presents an outlet opening 34 which is also in communication with return air duct 16 but at a location downstream from inlet opening 30. A second damper 32 is positioned adjacent outlet opening 34 to control airflow therethrough. A third damper which is designated by the numeral 36 is disposed in return air duct 16 between openings 30 and 34.

The two parallel stretches of conduit 22 are coupled together by means of a crossover conduit 38 located adjacent concrete wall 20 on the ground side of the latter and near inlet and outlet openings 30 and 34. One end of conduit 38 projects into the air path of conduit stretch 24 and the other end of conduit 38 projects into the path of air passing through conduit stretch 26 and this end is designated by the numeral 42. It is to be noted that end 40 projects into conduit stretch 24 only a relatively small distance while end 42 projects into the conduit stretch 26 for a distance of between 30% and 50% of the diameter of the conduit. Conduit 22 is disposed in a generally horizontal plane well below the earths surface 40 as best illustrated in FIG. 2. In most areas of the country the constant temperature depth zone is between 5 and 10 feet below surface 41. To improve the characteristics of the soil surrounding conduit 22 a layer of sand 42 or other fine absorbent soil may be packed around the entire length of the conduit. Sand and other sand-like materials retain moisture more than other types of soil and therefore lower the temperature during summer months.

In operation, damper 36 is normally placed in a closed position so as to divert air into first conduit stretch 24. This means, of course, that the return air from the heating and cooling unit 10 will pass through conduit 22 prior to returning to the unit 10. Air entering conduit 22 through inlet 30 will pass down stretch 24 moving away from the inlet and then back down stretch 26 moving toward outlet 34. As the air passes crossover conduit 38 the end 42 of this conduit acts as a diverter to cause a substantial portion of the air to enter the conduit whereby it will be recycled through both conduit stretches 24 and 26. The fact that end 40 of crossover conduit 38 extends slightly into first conduit stretch 24 increases the velocity of air passing the crossover conduit thereby causing a slight vacuum which helps to draw air from crossover conduit into first conduit stretch 24. Thus, between 25% and 35% of the air passing through conduit stretches 24 and 26 is being continuously recycled. This increases the retention time in the conduit and the effective overall length of the heat exchange conduit. Since the temperature of the soil surrounding the conduit is approximately 60° year round, the air passing through the conduit is heated in winter and cooled in summer. Often the heating or cooling effect provided by the underground conduit 22 results in the air entering the unit 10 having a temperature near the desired room temperature. Consequently, unit 10 need not be operated in its heating or cooling mode and only fan 12 is needed to draw air through the underground conduit. On the other hand, during periods of temperature extremes the heating and cooling functions of plant 10 may be operated to supplement the heating or cooling effect provided by conduit 22. This may be done without requiring any modification or changeover of the system.

FIG. 3 illustrates an alternative embodiment of the invention wherein conduit 22 is constructed of corrugated pipe designated by the numeral 122. It has been found that the presence of the corrugations will increase the turbulence of air flowing through the conduit thereby further enhancing the heat exchange function of the conduit in the soil. In all other respects the alternative embodiment is the same as the preferred embodiment shown in FIGS. 1 and 2.

Ordinarily, the air flowing in the return duct 16 is less than 60° in the winter and more than 70° in the summer. The temperature of the soil surrounding pipe 22 is approximately 60° year round. On a typical midsummer day in the midwestern United States, temperature readings were taken at various portions of the system as installed in an average sized residence. These temperatures are set forth below in tabular form. The fan 12 operated continuously, and the cooling unit 10 was off at all times except as indicated.

| 1 | 2 | 3 | 4 | 5 |
|---|---|---|---|---|
| 7:00 AM | 70° | 76° | 70° | 72° |
| 10:00 AM | 84° | 76° | 70° | 72° |
| 12:00 Noon | 90° | 76° | 70° | 72° |
| 2:00 PM | 95° | 78° | 70° | 73° |
| 3:00 PM | 96° | 80° | 70° | 73° |
| 5:30 PM | 92° | 80° | 70° | 74° |
| 7:30 PM | 86° | 76° | 70° | 78° |
| 10:00 PM | 78° | 80° | 72° | 78° |
| 12:30 AM |  | 80° | 70° | 74° |

Column 1 represents Time of Day
Column 2 represents Outside Air Temperature (F.°)
Column 3 represents Temperature of Air Entering Conduit 22 (F.°)
Column 4 represents Temperature of Air Exiting Conduit 22 (F.°)
Column 5 represents Temperature of Air Within Residence (F.°)

At 7:30 PM, the cooling unit 10 was operated for approximately one hour and provided air at 54° F. During the period from 7:00 AM to 7:30 PM, a total of 22 kilowatt hours of electricity were consumed by all of the electrical devices in the residence. The year before the test was made, the residence consumed an average of 45 kilowatt hours during the same time period as averaged over 90 days in the summer and with the cooling unit 10 operating normally but without the underground conduit 22. Accordingly, it is believed that over 20 kilowatt hours of electricity can be saved per day during the summer months by use of the system provided by this invention.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and within the scope of the claims.

Since many possible embodiments may be made of the invention without departing from the scope thereof, it is to be understood that all matter herein set forth or shown in the accompanying drawings is to be interpreted as illustrative and not in a limiting sense.

I claim:
1. A method of thermally treating air comprising:
   forcing the air to flow along an underground path through the soil in heat exchange relationship therewith;
   recycling a portion of the air traveling along said path;
   increasing the velocity of said recycled air as the latter commences travel along said path; and
   retreiving a portion of the air traveling along said path for use at a remote location.
2. A subterranean air treatment system adapted to be coupled with means for forced air circulation, said system comprising:
   an underground conduit presenting an elongated path accommodating the flow of air therethrough and having an inlet end for receiving incoming air and an outlet end for discharging air, said conduit extending through the soil beneath the surface of the ground, said conduit being characterized by a first stretch for air moving away from said inlet end and a second stretch for air moving toward said outlet end;

means for coupling said first and second stretches together;

means in said first conduit stretch for increasing the velocity of the air moving through said coupling means; and air diverter means disposed in said second conduit stretch for directing a part of the air traveling through said stretch into said coupling means whereby said diverted air is recycled through said first and second stretches.

3. The invention of claim 1, wherein said conduit comprises a corrugated tube.

4. The invention of claim 1, wherein said first and second stretches are parallel to each other.

5. The invention of claim 1, wherein is included damper means at each of said inlet and outlet ends for controlling airflow through said conduit.

* * * * *

UNITED STATES PATENT AND TRADEMARK OFFICE
CERTIFICATE OF CORRECTION

PATENT NO. : 4,279,291
DATED : July 21, 1981
INVENTOR(S) : Roland Lambert

It is certified that error appears in the above–identified patent and that said Letters Patent are hereby corrected as shown below:

Claim 3 should read:  "The invention of claim 2 ... "

Claim 4 should read:  "The invention of claim 2 ... "

Claim 5 should read:  "The invention of claim 2 ... "

Signed and Sealed this

Twenty-second Day of September 1981

[SEAL]

Attest:

GERALD J. MOSSINGHOFF

Attesting Officer

Commissioner of Patents and Trademarks